UNITED STATES PATENT OFFICE.

HEINRICH AUGUST BERNTHSEN, OF MANNHEIM, GERMANY, ASSIGNOR TO THE BADISCHE ANILIN AND SODA FABRIK, OF LUDWIGSHAFEN, GERMANY.

OXYNAPHTINDOPHENOLTHIOSULFONIC ACID AND PROCESS OF MAKING SAME.

SPECIFICATION forming part of Letters Patent No. 625,637, dated May 23, 1899.

Application filed December 16, 1897. Serial No. 662,179. (Specimens.)

*To all whom it may concern:*

Be it known that I, HEINRICH AUGUST BERNTHSEN, doctor of philosophy, a subject of the King of Prussia, Emperor of Germany, residing at Mannheim, in the Grand Duchy of Baden and Empire of Germany, have invented new and useful Improvements in the Manufacture and Production of Oxynaphtindophenolthiosulfonic Acid,) for which patent has been obtained in England, dated October 23, 1893, No. 19,962,) of which the following is a specification.

My present invention consists in having found that an equimolecular mixture of an unsymmetrical dialkylated-paradiamin thiosulfonic acid—such as has been discovered by me (*Annalen der Chemie*, Vol. 251, page 1) and is practically applied in the manufacture of methylene blue—and 1.2-amidonaphtholsulfoacid or the corresponding dioxy-naphthalene-sulfoacid by suitable moderate oxidation similar to that serving for the preparation of the usual indophenol gives rise to the formation of a composition which I call "oxy-naphtindo-phenol-thio-sulfonic acid" or "thio-sulfonate" and which I hereinafter designate by the term "oxynaphtindophenol-thio-sulfonic body" and which is a valuable dyestuff, being especially suited for printing on cotton goods in the presence of a chromium mordant, and thus giving shades of a most remarkable fastness against washing and light. The same dyestuffs are obtained without the use of an oxidizing agent if the above-described para-diamin-thio-sulfonic acid be condensed in a suitable manner with 1.2-nitroso-beta-naphthol-sulfoacid. In every case, whether a sulfo-acid of amido-naphthol or of dioxy-naphthalene or of nitroso-beta-naphthol be taken, the sulfo group must be in the beta position in the otherwise unsubstituted half of the naphthalene ring.

Practical results have hitherto been obtained, especially with unsymmetrical dimethyl or diethyl-para-phenylene-diamin-thio-sulfonic acid, on the one hand, and the sulfo-derivative of 1.2-amido-naphthol or of 1.2-nitroso-naphthol or of 1.2-dioxy-naphthalene on the other hand.

The production of the new substance is further illustrated by the following examples. The parts are by weight.

*Example 1. Production of oxy-naphtindo-phenol-thio-sulfonic acid by the aid of 1.2.6-amido-naphthol-sulfo acid.*—Twenty-four and eight-tenths (24.8) parts of unsymmetrical dimethyl (diethyl) para-phenylene-diamin-thio-sulfonic acid and twenty-three and nine-tenths (23.9) parts of amido-naphthol-sulfo-acid 1.2.6 are dissolved in three hundred (300) parts of water under addition of a quantity of caustic ammonia just sufficient for giving a neutral solution of the ammonia salts of the said acids. Then into this solution at a temperature of about twelve to fifteen degrees centigrade (12° to 15° C.) and while constantly stirring, two hundred and seventy parts (270) of a twenty-four-per-cent. (24%) solution of ferric chlorid are run in. After some stirring and standing the precipitate formed is filtered off and washed with water containing a little hydrochloric acid. Then one presses and dries at the ordinary or only slightly-elevated temperature. The substance obtained is the free oxy-naphtindo-phenol-thio-sulfonic acid. In this example the ferric chlorid can be replaced by other oxidizing agents which are in use for the preparation of indophenols. Thus, for instance, the equivalent quantity of potassium or sodium bi-chromate in acetic-acid solution can be used. In this case not the free thio-sulfonic acid, but its alkali salt, is obtained, which upon the addition of common salt or of potassium chlorid can be filtered and cautiously dried.

*Example 2. Production of 1.2.6-nitroso-naphthol-sulfoacid.*—Twelve and four-tenths (12.4) parts of unsymmetrical dimethyl (diethyl) para-phenylene-diamin-thio-sulfonic acid and thirteen and eight-tenths (13.8) parts of nitroso-beta-naphthol-sulfo acid (Schaeffer) are dissolved in four hundred (400) parts of cold water under addition of nine (9) parts of ammonia liquor containing twenty per cent. (20%) ammonia. The solution is acidulated by the addition of eighty (80) parts of an acetic acid containing thirty per cent. (30%) of real acetic acid, and then heated to boiling or warmed on the water-bath during a quarter of an hour or until the brownish-yellow color of the solution has disappeared and no more increase of intensity of the dull violet-red color is observed, which the liquid assumes. A further heating is to be avoided in order to prevent further transformation of the formed product. The liquid is then salted out as described at the end of the first example.

The oxy-naphtindo-phenol-thio-sulfonic body, as prepared according to either of the prescriptions hereinbefore given, in the form of its free acid has the following characteristics: It exists as a reddish-brown crystalline powder or small brown needles. It dissolves in water with a light-brown color. It dissolves more easily in caustic-soda or caustic-potash solution, with the color of its salts described hereinafter. From the latter solutions, if these are not too diluted, it is precipitated again by the addition of hydrochloric acid. In concentrated sulfuric acid it gives a yellow color, which on heating turns green, and this solution, on addition of water, then gives a bluish precipitate. When heated with dilute sulfuric or dilute hydrochloric acid, decomposition takes place. In the form of its alkali salts it has the following characteristics: They exist as dark-bluish powders of a coppery luster. They dissolve in water with a dull wine-red to violet-brownish color. They are precipitated by the addition of common salt or of potassium chlorid as bluish precipitates. Toward concentrated and dilute sulfuric or dilute hydrochloric acids they show the same behavior as the free acid. If printed on cotton, with or without the addition of sodium acetate or sodium-thio-sulfate and in the presence of chromium mordants, they yield bright blue shades of a very considerable fastness against light and washing, while with an alumina mordant more reddish shades are produced.

What I claim as new, and desire to secure by Letters Patent, is—

1. The process of making an oxy-naphtindophenol-thio-sulfonic body, as hereinbefore defined, by the oxidation of a mixture of unsymmetrical dialkyl-para-phenylene-diamin-thio-sulfonic acid, and 1.2-amido-naphthol-sulfo-acid, all such as specified, substantially as described.

2. As a new article of manufacture an oxy-naphtindophenol-thio-sulfonic body, which can be obtained from a mixture of unsymmetrical dialkyl-para-phenylene-diamin-thio-sulfonic acid and a sulfo-acid of 1.2-di-substituted naphthalene, and which gives a yellow color with concentrated sulfuric acid, which yellow color changes to green when warmed, and this mixture gives, on addition of water, a bluish precipitate, all substantially as described.

In testimony whereof I have hereunto set my hand in the presence of two subscribing witnesses.

HEINRICH AUGUST BERNTHSEN.

Witnesses:
GUSTAV L. LICHTENBERGER,
PAUL JULIUS.